United States Patent [19]
Mannsfeld

[11] 3,878,057
[45] Apr. 15, 1975

[54] PLURAL STAGE DISTILLATION OF A CRUDE 3-METHYLMERCAPTOPROPIONALDEHYDE FEED IN SOLUTION WITH A VOLATILE WEAK ACID AND A LESS VOLATILE STRONG ACID

[75] Inventor: Sven-Peter Mannsfeld, Bruhl, Germany

[73] Assignee: Deutsche Gold-und Silber-Scheideanstalt vormals Roessler, Frankfurt am Main, Germany

[22] Filed: Nov. 20, 1972

[21] Appl. No.: 307,826

[30] Foreign Application Priority Data
Nov. 26, 1971 Germany............................ 2158616

[52] U.S. Cl................. 203/35; 260/601 R; 203/34; 203/51; 203/61

[51] Int. Cl............................................. B01d 3/34
[58] Field of Search............ 203/34, 35, 38, 51, 61, 203/6, 8; 260/601 R

[56] References Cited
UNITED STATES PATENTS

| | | | |
|---|---|---|---|
| 2,776,996 | 1/1957 | Hunt et al....................... | 260/601 R |
| 3,220,932 | 11/1965 | Crandall............................... | 203/38 |
| 3,438,868 | 4/1969 | Sawaki et al............................ | 203/8 |

Primary Examiner—Norman Yudkoff
Assistant Examiner—Frank Sever
Attorney, Agent, or Firm—Cushman, Darby & Cushman

[57] ABSTRACT

Pure 3-methylmercaptopropionaldehyde is recovered from a crude mixture by distillation in the presence of a mixture of a difficultly volatile strong acid and an easily volatile weak acid.

9 Claims, 1 Drawing Figure

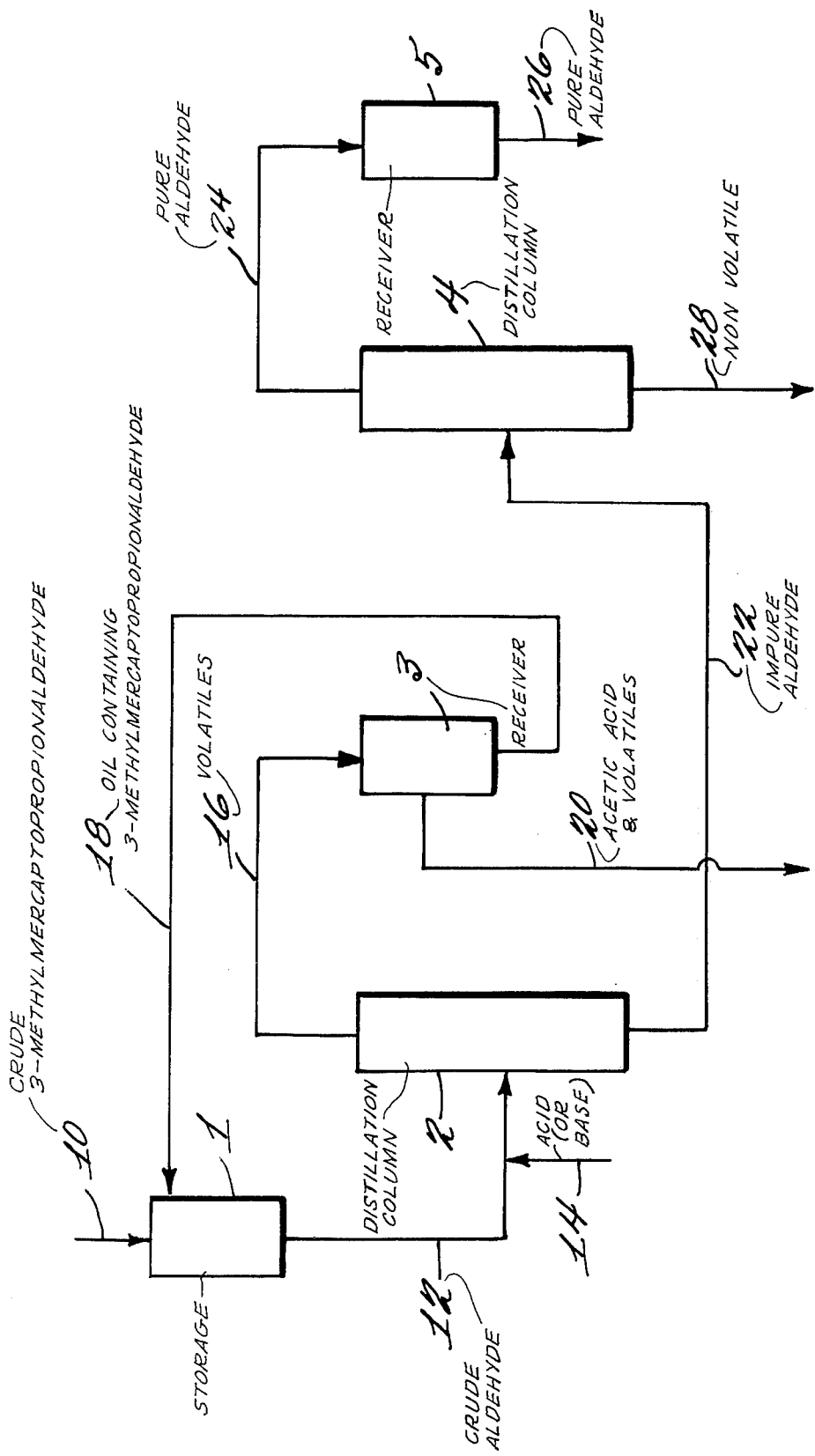

PLURAL STAGE DISTILLATION OF A CRUDE 3-METHYLMERCAPTOPROPIONALDEHYDE FEED IN SOLUTION WITH A VOLATILE WEAK ACID AND A LESS VOLATILE STRONG ACID

The invention is concerned with a process for the recovery of pure 3-methylmercaptopropionaldehyde from the crude product by distillation. 3-methylmercaptopropionaldehyde is the starting material for the product of the amino acid methionine which is valuable as an animal feed supplement.

It is known to produce 3-methylmercaptopropionaldehyde by reaction of acrolein with methyl mercaptan. In this reaction there results a crude 3-methylmercaptopropionaldehyde containing up to 10% of impurities. It is chiefly a matter of unreacted starting materials and additionally by- or fission-products, for example, water and acetaldehyde. Generally, for the further use of the 3-methylmercaptopropionaldehyde the crude product must first be purified. For example, for the manufacture of methionine an at least 99.5% pure methylmercaptopropionaldehyde is desired. It is known to purify 3-methylmercaptopropionaldehyde by a distillation, namely chiefly by a two step process in which in the first step the separation of the easily volatile constituents takes place and in the second step the true pure distillation of methylmercaptopropionaldehyde, see Cunningham, U.S. Pat. No. 2,626,282. In the distillation of the crude product polymerization and other side reactions occur to a considerable extent. The materials formed thereby make the distillation difficult, especially in carrying it out continuously. The yield of the aldehyde is noticeably reduced, frequently about 10 to 20%.

It is also known in the production of 3-methylmercaptopropionaldehyde using nitrogen bases such as pyridine as catalysts to add an acid, preferably acetic acid during the reaction to avoid polymerzation and other side reactions, see Hunt, U.S. Pat. No. 2,776,996. The entire disclosure of Hunt is hereby incorporated by reference. Crude products which are produced according to this process should not undergo any visible polymerization. Actually the side reactions under certain conditions are somewhat reduced, however, they are not eliminated.

There has now been developed a process for the recovery of pure 3-methylmercaptopropionaldehyde from crude products by distillation in presence of acids which is characterized by using a mixture of a difficultly volatile strong acid with an easily volatile weak acid. Usually 60 to 90% of the mixture of acids is easily volatile acid and the rest is difficultly volatile acid.

The easily volatile weak acid generally has a boiling point below that of 3-methylmercaptopropionaldehyde and the difficultly volatile acid generally has a boiling point above that of 3-methylmercaptopropionaldehyde at the pressure employed. 3-methylmercaptopropionaldehyde boils at about 100°C. at 40 Torr.

As difficultly volatile strong acids there is preferably used sulfuric acid but there can be used other strong acids such as phosphoric acid, arylsulfonic acids, such as benzene sulfonic acid, toluenesulfonic acid, etc.

As volatile weak acids there are chiefly employed organic acids, especially acetic acid. Other suitable weak acids include formic acid and propionic acid.

By use of the mixture of easily volatile weak acids and difficulty volatile strong acid there is surprisingly effectively suppressed polymerization and other side reactions and the loss of 3-methylmercaptopropionaldehyde is effectively reduced. There is obtained an about 10% higher yield of pure 3-methylmercaptopropionaldehyde than by known processes. The loss in yields occurring in the distillation including those through polymerization and other side reactions are below 2%. The distillation plant produces nearly a doubled capacity since the distillation is not made difficult through the formation of byproducts. The aldehyde accumulates in a purity of at least 99.5%.

The amount of acid which is suitable to a certain extent depends on the proportion of alkaline impurities in the crude 3-methylmercaptopropionaldehyde. With these impurities it is principally a matter of the nitrogen bases serving as catalysts for the production of the aldehyde. These nitrogen bases include alkylamines, e.g., triethylamine, trimethylamine, tributylamine, alkanolamines, e.g., triethanolamine and tripropanolamine and heterocyclic bases, e.g., pyridine, quinoline and piperidine. The base is usually present in an amount of 0.01 to 0.1 weight per cent of the crude product. In the case where the crude 3-methylmercaptopropionaldehyde is free of these bases or contains less base it is generally advantageous to add a corresponding amount of these bases, primarily weak bases, such as pyridine.

Suitably, the strong acids are used in an amount which is at least equivalent to the entire amount of base. The addition of strong and weak acids is so formulated that in the distillation there is maintained a pH of 3 to 8 in the sump of the column, preferably a pH of 4 to 6, and in the remaining part of the column, including the receiver, a pH of 3 to 9, preferably 5 to 7.

The acids can be mixed with the crude 3-methylmercaptopropionaldehyde before the distillation. Thereby, the aldehyde generally acquires a pH of 4 to 6, especially a pH of 5 to 6. It is also possible to feed the acids partially or completely separate from the aldehyde, in a given case individually or as a mixture of acids in one or more places in the distillation apparatus.

Advantageously, the distillation according to the invention is carried out in two steps while always at reduced pressure in a first step the constituents boiling at lower temperatures are driven off and in the second step the pure distillation of the 3-methylmercaptopropionaldehyde takes place.

The single FIGURE of the drawings illustrates in schematic fashion a preferred method of carrying out the process of the invention.

Referring more specifically to the drawing, there is shown a two step apparatus which can be operated especially advantageously in continuous fashion. Crude 3-methylmercaptopropionaldehyde goes via conduit 10 into storage vessel 1. The crude aldehyde then goes via conduit 12 into the distillation column 2 of the first step and is fed here between the portion driven off and the portion concentrated. The acid mixture and, in a given case, the base are fed with the crude product, e.g., via conduit 14. If required, the acid and base addition also can take place only or additionally in other places in the apparatus. The distillation in the first step takes place at reduced pressure, preferably at 20 to 100 Torr and a sump temperature of 80° to 100° C. In the first step the easily volatile impurities are driven off. In the sump of the column there remain in addition to the 3-methylmercaptopropionaldehyde difficultly volatile constituents such as sulfuric acid, sulfuric acid salts and in a given case, polymerizes. The volatile constituents got to receiver 3 via conduit 16. In receiver 3 besides a small amount of the aldehyde there are collected the easily volatile constituents. In the receiver there is formed a lower oily phase containing the 3-methylmercaptopropionaldehyde which can be returned to the storage vessel 1 via conduit 18 or returned to distillation column 2 by a conduit (not shown) and an upper phase of aqueous acetic acid (or other easily volatile acid) containing the easily volatile impurities. The upper phase is drawn off via conduit 20.

From the sump of the first step the impure aldehyde still containing the difficultly volatile constituents goes via conduit 22 into the distillation column 4 of the second step. The aldehyde is separated from these relatively non volatile materials by distillation. In the second step the operation is preferably at 10 to 30 Torr and a sump temperature of 90° to 100° C. The pure aldehyde goes by conduit 24 to receiver 5 and is recovered via conduit 26. The non-volatile materials are withdrawn from the sump of column 4 via conduit 28.

To remove the residue of the aldehyde from the material drawn off from the sump of the second step there can be connected in a given case a third distillation, for example in a thin film evaporator.

The distillation is suitably carried out so that in the first distillation step there is established in the sump of the column a pH value of 3 to 8, preferably 4 to 6 and in the remaining part of the column inclusive of the receiver a pH of 3 to 9, preferably 5 to 7. In the sump of the second step there should be present a pH of 4 to 6 preferably about 5.

Unless otherwise indicated, all parts and percentages are by weight.

EXAMPLE:

In a column of the described type there were fed hourly 6000 grams of crude, about 95% 3-methylmercaptopropionaldehyde which contained 2.5 grams of pyridine and triethylamine. There were introduced with the aldehyde 2.5 grams of 20% sulfuric acid and 3 grams of 60% acetic acid. Distillation was carried out in the first step at 40 Torr and a sump temperature of 90° to 100° C., in the second step at 12 Torr and the same sump temperature. In the first step there were fed in hourly to the head of the column 3 grams of 60% acetic acid. In the receiver of the first step there were collected hourly 120 grams of aqueous phase and 238 grams of aldehyde phase. The water phase was discarded, the aldehyde phase was returned to the storage vessel for the crude aldehyde. In the receiver of the second step there were recovered hourly 5580 grams of 3-methylmercaptopropionaldehyde having a purity of 99.8%.

The crude aldehyde after admixture with the acids had a pH of 5.4. In the first distillation step the pH value in the sump was 5.2 and in the remaining part of the column 6.0. In the second step the sump had a pH of 5.0. Samples were taken at the various places to measure the pH value. The measurements were always taken in an aqueous extract of the sample.

What is claimed is:

1. In a process of recovery of pure 3-methylmercaptopropionaldehyde from a base containing crude product by a two step distillation in the presence of an acid the improvement comprising carrying out the distillation steps in the presence of a mixture of a difficultly volatile strong acid selected from the group consisting of sulfuric acid, phosphoric acid and aryl sulfonic acid and an easily volatile weak acid selected from the group consisting of formic acid, acetic acid and propionic acid, said difficultly volatile strong acid having a boiling point higher than 3-methylmercaptopropionaldehyde and said easily volatile weak acid having a boiling point lower than 3-methylmercaptopropionaldehyde, distilling off the volatile impurities and said easily volatile weak acid as overheads in the first distillation step, leaving a bottoms containing 3-methylmercaptopropionaldehyde and said difficultly volatile strong acid, and distilling the 3-methylmercaptopropionaldehyde as overheads in the second distillation step leaving a bottoms containing said difficultly volatile strong acid.

2. A process according to claim 1 wherein the strong acid is sulfuric acid or phosphoric acid and the weak acid is acetic acid.

3. A process according to claim 1 wherein the strong acid is sulfuric acid.

4. A process according to claim 1 wherein, the volatile impurities are distilled in the first distillation step where a pH of 3 to 8 is maintained in the sump of the distillation unit and a pH of 3 to 9 in the rest of the unit and the aldehyde is distilled in the second distillation step where a pH of 4 to 6 is maintained.

5. A process according to claim 4 wherein the pH in the sump of the first unit is 4 to 6, the pH in the remainder of the first unit is 5 to 7 and the pH in the second step is about 5.

6. A process according to claim 5 wherein the strong acid is sulfuric acid and the weak acid is acetic acid.

7. A process according to claim 6 wherein the distillate from the first step contains water and is separated into an aqueous upper layer and a 3-methylmercaptopropionaldehyde containing lower layer and the lower layer is returned to the first distillation unit.

8. A process according to claim 1 wherein the easily volatile weak acid is 60 to 90% of the mixture of strong and weak acids.

9. A process according to claim 1 wherein the crude product includes a tertiary amine as an impurity.

* * * * *